United States Patent
Migli

(10) Patent No.: US 6,986,488 B2
(45) Date of Patent: Jan. 17, 2006

(54) DISAPPEARING DEVICE FOR SHELF SUPPORT IN FURNITURE

(75) Inventor: Carlo Migli, Lecco (IT)

(73) Assignee: Agostino Ferrari S.p.A., (IT)

(*) Notice: Subject to any disclaimer, the term of this patent is extended or adjusted under 35 U.S.C. 154(b) by 20 days.

(21) Appl. No.: 10/770,674

(22) Filed: Feb. 2, 2004

(65) Prior Publication Data

US 2004/0155163 A1   Aug. 12, 2004

(30) Foreign Application Priority Data

Feb. 12, 2003  (IT)  ............................ MI2003U0052
May 14, 2003  (IT)  ............................ MI2003U0231

(51) Int. Cl.
*A47G 29/02*   (2006.01)

(52) U.S. Cl. ...................... 248/250; 248/239

(58) Field of Classification Search ............... 248/239, 248/240, 240.1, 240.3, 240.4, 222.11; 312/408, 312/351; 108/152, 42

See application file for complete search history.

(56) References Cited

U.S. PATENT DOCUMENTS

| | | | | |
|---|---|---|---|---|
| 2,252,570 A | * | 8/1941 | Knuth | ........................ 211/183 |
| 2,901,806 A | * | 9/1959 | Henshel | ..................... 24/265 R |
| 3,242,868 A | * | 3/1966 | Gold | ............................ 92/168 |
| 3,870,266 A | * | 3/1975 | MacDonald | ................ 248/235 |

FOREIGN PATENT DOCUMENTS

| | | |
|---|---|---|
| EP | 1228721 A | 8/2002 |
| GB | 2005989 A  * | 5/1979 |
| GB | 2332470 A | 6/1999 |
| WO | WO 9622921 | 8/1996 |

* cited by examiner

*Primary Examiner*—Gwendolyn Baxter
(74) *Attorney, Agent, or Firm*—Shlesinger & Fitzsimmons

(57) ABSTRACT

A disappearing shelf support for furniture comprises a casing (13, 113) having a seat (14, 114) in which a pin (15, 115) is housed, which pin axially slides in the seat between an operating position, at which the pin has its front portion projecting from a front wall of the casing (13, 113) and out of the shelf edge, and a non-operating position at which the pin is retracted in its seat so that it does not project from the shelf edge. A working element (16, 116) laterally projects from the pin (15, 115) and slides in a groove (17, 117) in the casing that is open on a side face (18, 118) of said casing to enable manual operation of the pin (15, 115) between the two positions thereof. Also present in the casing is fitting means (20, 120) for an unstable maintenance of the pin in the retracted position, which fitting means is disposed between the side wall of said groove (17, 117) and said working element (16, 116) sliding therein.

16 Claims, 3 Drawing Sheets

DISAPPEARING DEVICE FOR SHELF SUPPORT IN FURNITURE

BACKGROUND OF THE INVENTION

1. Field of the Invention

The present invention relates to a disappearing shelf-supporting device for furniture.

2. State of the Prior Art

Devices for shelf support in furniture are known which are adapted to be inserted in an appropriate seat on the shelf edge and are provided with a pin elastically jutting out of the edge for fitting into a hole in the wall of the piece of furniture.

These devices have construction expedients capable of enabling the pin to keep two steady positions, a rest and an operating positions respectively. In the first position the pin is retracted in the shelf edge and in the second it projects from the shelf edge.

For obtaining this operation in known devices elastic wings are generally present that interfere with appropriate hollows in the side wall of the pin: in order to move the pin between the two positions the elastic resistance of the wings is to be manually overcome.

The structure of known devices of the mentioned type however, is relatively complicated because a given number of component pieces are to be made that are then assembled to obtain the complete device. Alternatively, the number of pieces can be reduced, making the elastic wings of one piece construction with the device body for example, which body is in turn of one piece construction. But the known structure, with elastic wings emerging in the pin seat, makes molding of the device complicated and increases the mould cost.

Since on the market these devices are required to be as much as possible cheap, the known structures are not therefore satisfactory in this respect. In addition, to enable the device to fit shelves of small thickness, said device must be relatively small and this prevents the obtained elastic wings from being strong. Therefore when submitted to the stress of repeated operations, known devices show a worrying tendency to breaking.

A further important drawback of the known art resides in that known devices are hardly maneuverable without use of a tool (a screwdriver for example) and this makes positioning of the shelves utilizing such devices less prompt.

It is a general aim of the present invention to obviate the above mentioned drawbacks by providing a shelf-supporting device with a disappearing pin that is particularly strong, cheap and of easy handling.

SUMMARY OF THE INVENTION

In view of the above aim a disappearing shelf-supporting device for furniture has been conceived, in accordance with the invention, which is designed to be housed on the edge of a shelf and comprises a casing having a seat in which a pin is housed, which pin axially slides in the seat between an operating position, at which the pin has its front portion projecting from a front wall of the casing and out of the shelf edge, and a non-operating position at which the pin is retracted in its seat for not projecting from the shelf edge, a working element laterally projects from the pin and slides in a groove in the casing, which groove is open on a side face of the casing to enable manual operation of the pin between the two positions of same, fitting means being further present in the casing for an unstable maintenance of the pin in the retracted position, wherein the fitting means for an unstable maintenance of the pin in the retracted position is disposed between the side wall of said groove and said working element sliding therein.

BRIEF DESCRIPTION OF THE DRAWINGS

For better explaining the innovative principles of the present invention and the advantages it offers over the known art, possible embodiments applying said principles will be described hereinafter, by way of non-limiting examples, with the aid of the accompanying drawings. In the drawings.

DETAILED DESCRIPTION OF THE INVENTION

Figure 1:
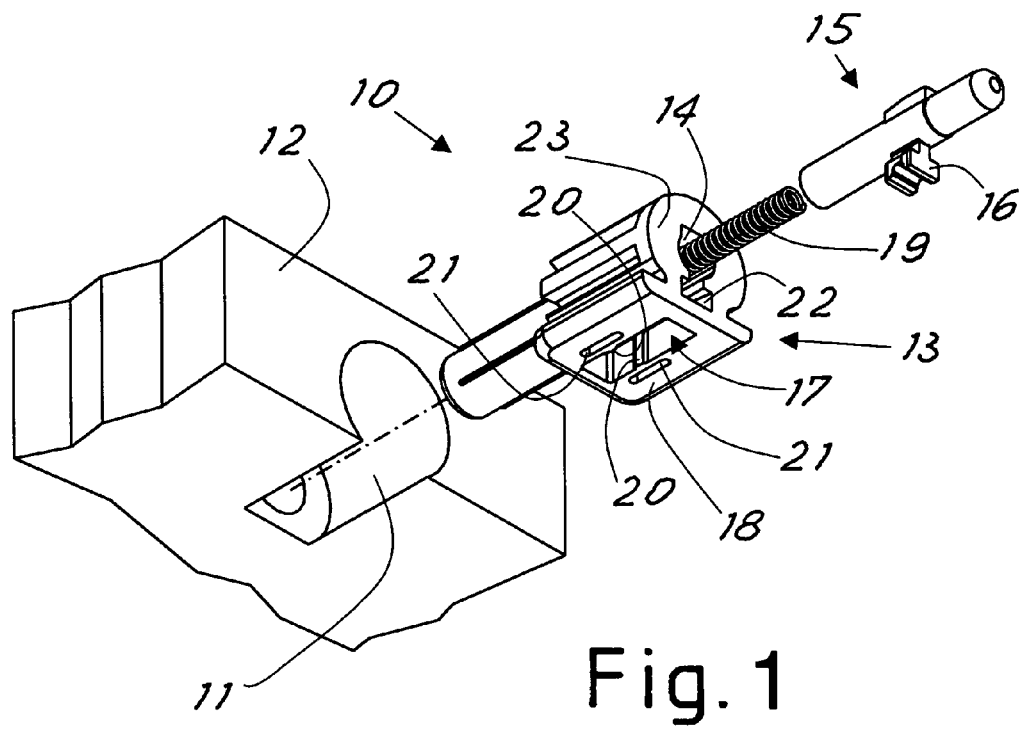
FIG. 1 is a diagrammatic exploded perspective view of a device in accordance with the invention.

With reference to the drawings, a disappearing shelf-supporting device for furniture is shown in FIG. 1 and generally denoted at 10, which device is designed to be housed in a cavity 11 on the edge of a shelf 12.

The shelf support comprises a casing 13 with a seat 14 in which a pin 15 is housed which pin axially slides in the seat between an operating position at which the pin has its front portion projecting from a front wall of the casing and out of the shelf edge, and a non-operating position at which the pin is retracted in the seat for not projecting from the shelf edge. The operating and non-operating positions of the pin are shown in chain line and solid line respectively in FIG. 2.

As known, two pairs of shelf supports disposed on opposite edges of a shelf can bear the shelf in a piece of furniture by fitting the pins in an operating position into appropriate seats or holes formed in the inner wall of the piece of furniture.

Figure 2:
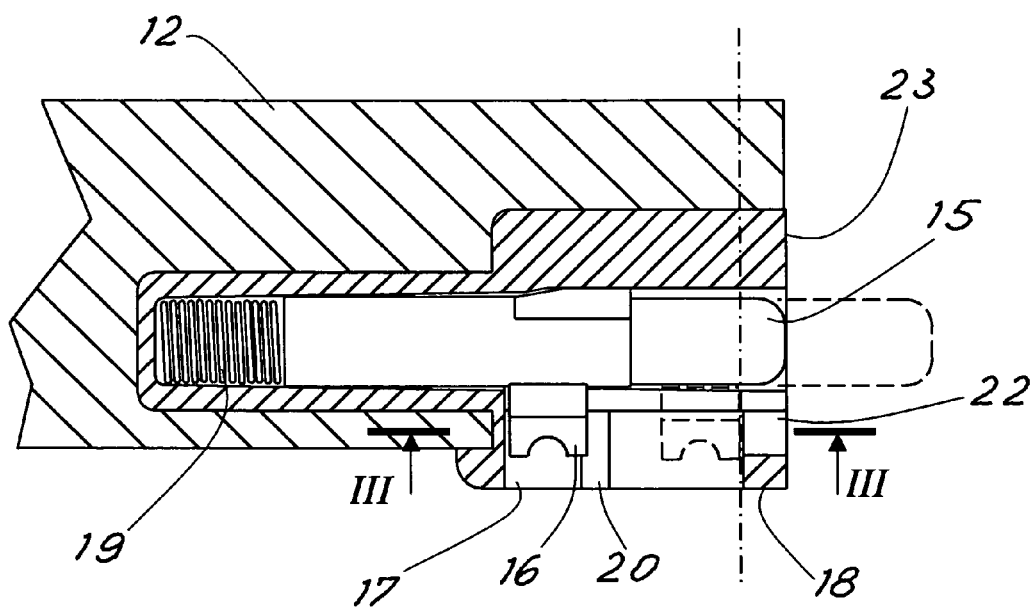
FIG. 2 is a side view partly in longitudinal section of the device in FIG. 1.

As can be clearly seen in FIGS. 1 and 2, a working element 16 laterally projects from the pin and slides in a groove 17 in the casing that is open on a side face 18 of the casing itself. This side face 18 is designed to set itself parallel to the lower surface of the shelf to project therefrom.

The working element 16 thus allows manual operation of the pin between the two positions thereof. For operation a screw-driver can be for example employed which fits into a hollow advantageously formed in the end of the element itself.

The groove and working element advantageously have a generally T-shaped cross section with the "T" foot directed towards the pin axis.

Also present in the casing is fitting means for an unstable maintenance of the pin in the retracted position, so that the pin does not inopportunely move from the non-operating position to the operating position (and, if wished, from the operating position to the non-operating position) without the working element being acted upon. In particular, the pin can be advantageously urged to the operating position by means of a helical spring 19 placed at the bottom of the seat to act rearwardly of the pin. In this case, the fitting means must efficiently counteract the spring thrust. In other words, the helical spring has a lower thrust force than the force required for overcoming the fitting means.

Figure 3:
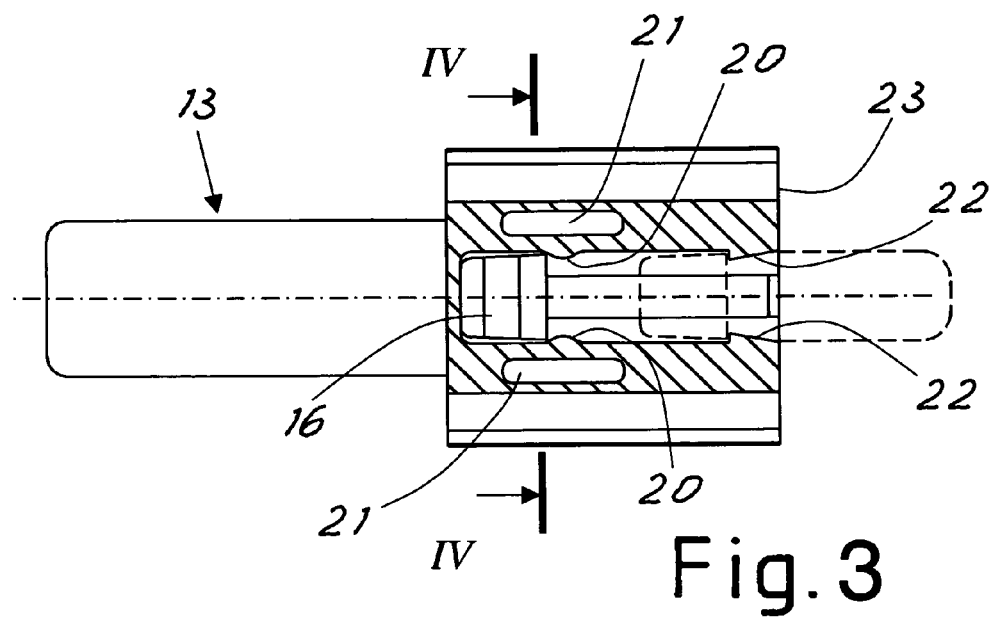
FIG. 3 shows a view of the device partially sectioned along line III—III in FIG. 2.
Figure 4:
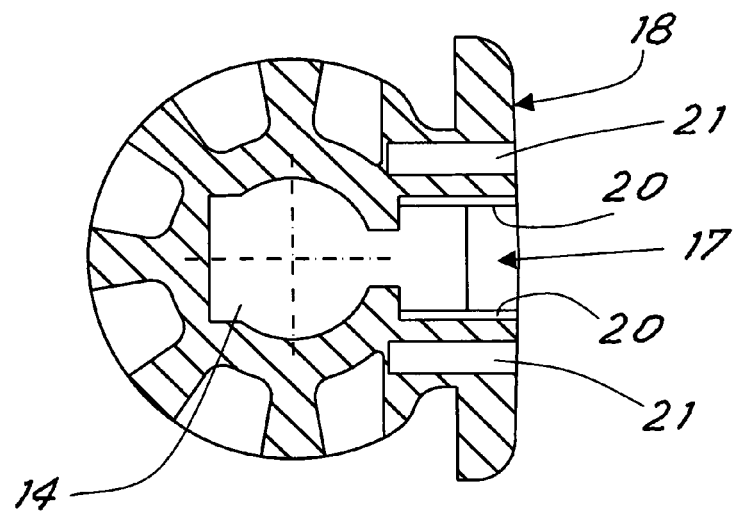
FIG. 4 is a view of the device body partly sectioned along line IV—IV in FIG. 3.

As better shown in FIGS. 2 and 3, the fitting means 20 for an unstable maintenance of the pin in the retracted position is disposed between the side wall of groove 17 and element 16 sliding therein. In particular, this fitting means comprises two projections 20 facing themselves on opposite side walls of the groove and jutting out in the groove to interfere with element 16 and during sliding of same along the groove. Advantageously, projections 20 are extended in a direction normal to the sliding direction of the element in the groove and each interfere with a front corner of the working element, as clearly shown in FIG. 2. The projections can be stepped over when a thrusting action is manually exerted on the working element due to the elasticity of the surfaces coming into contact with each other. This elasticity can be merely obtained by suitably selecting the plastic material for manufacture of the casing. More advantageously, the casing can be formed with a cavity 21 behind each of the side walls carrying the projections. Thinning of the wall thus provides an elastic support for the projections. Advantageously, the cavities open on the side face 18 of the casing. In this way they can be easily obtained during molding of the casing.

The pin seat 14 and groove 17 are open on the front face 23 of the casing so as to allow the first axial introduction of the pin into the seat in the casing. Also present in the casing is stop limit means preventing a subsequent movement of the pin beyond the operating position, so that said pin cannot unintentionally fully come out of the casing and separate therefrom.

As viewed from FIG. 3, the stop limit means is advantageously embodied by "fish bone-shaped" teeth 22, disposed close to the groove opening on the front face of the casing and directed to the groove inside. Due to the inclination and size of the teeth, passage of the working element is allowed when the device is assembled pushing the pin into the seating. After that, the inner edge of the teeth forms a stop limit against which the front corner of the working element strikes (as shown in chain line in FIG. 3), so as to prevent the pin from coming out beyond the operating position.

Figure 5:
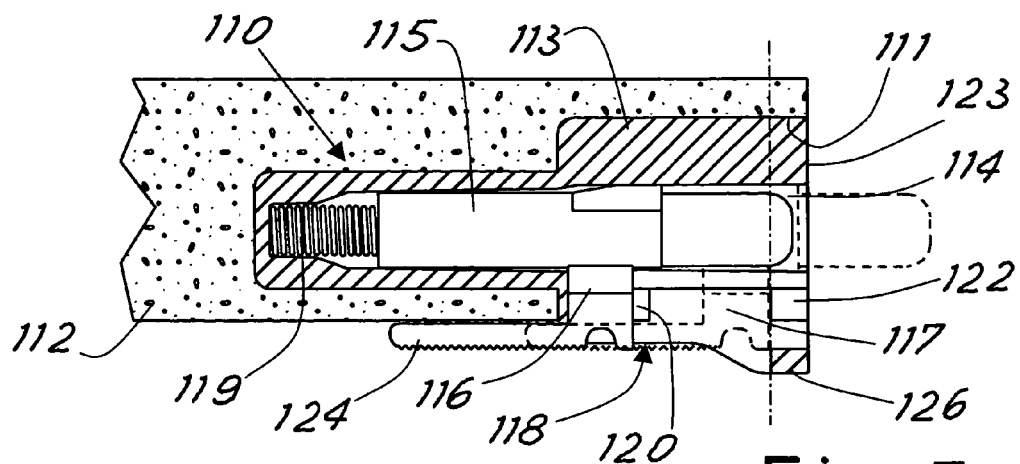
FIG. 5 is a section view of a second embodiment of a device according to the present invention.

A second embodiment of a disappearing shelf-supporting device for furniture is shown in FIG. 5 and generally denoted at 110, which device is designed to be housed in a cavity 111 on the edge of a shelf 112.

The shelf support comprises a casing 113 with a seat 114 in which a pin 115 is housed which pin axially slides in the seat between an operating position at which the pin has its front portion projecting from a front wall of the casing and out of the shelf edge, and a non-operating position at which the pin is retracted in the seat for not projecting from the shelf edge. The operating and non-operating positions of the pin are shown in chain line and solid line, respectively.

As known, two pairs of shelf supports disposed on opposite edges of a shelf can bear the shelf in a piece of furniture by fitting the pins in an operating position into appropriate seats or holes formed in the inner wall of the piece of furniture.

Figure 6:
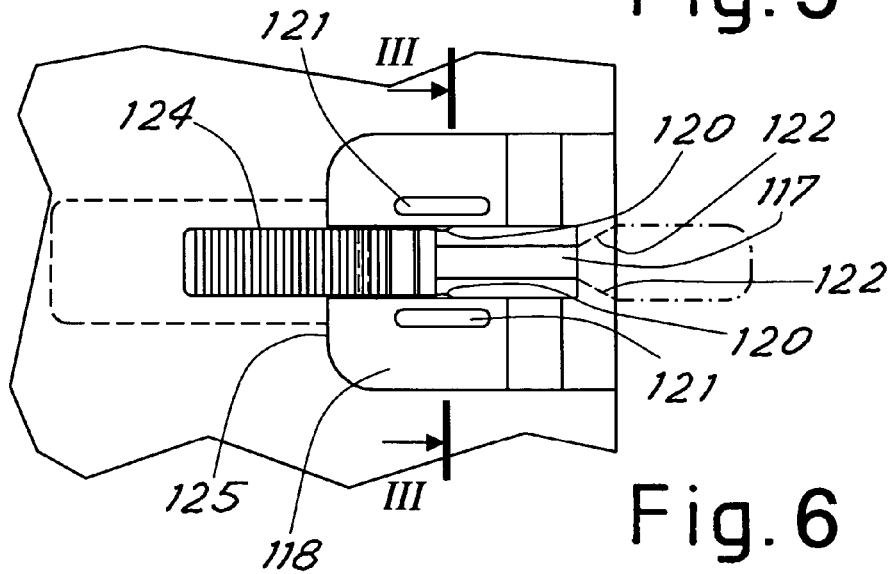
FIG. 6 is a bottom view of the device in FIG. 5.

As can be clearly seen in FIGS. 5 and 6, a working element 116 laterally projects from the pin and slides in a groove 117 in the casing that is open on a side face 118 of the casing itself. This side face 118 is designed to set itself parallel to the lower surface of the shelf to project therefrom. The groove and working element advantageously have a generally T-shaped cross-section with the "T" foot directed towards the pin axis.

The working element 116 terminates on the side face 118 with a slider 124 advantageously having a finely undulated or transversely knurled surface, extending parallel to the side face to be maneuverable with one finger to make the pin slide between the two positions thereof.

Advantageously, the slider extends rearwardly, in an L-shaped conformation with respect to the working element, in a direction parallel to the pin axis, with an undulated surface slightly projecting from the device face 118, so as to allow easy operation of same. The slider protection between the two portions of wall 118 makes an accidental movement for unlocking the device in the operating position less likely to occur.

Still advantageously, the groove 117 is open rearwardly on the edge 125 of surface 118 and the rear portion of the slider is elongated to such an extent that when the pin is in an operating position the slider is fully contained between the two body portions defining surface 118 (as viewed in chain line in FIG. 1), whereas when the pin is in a non-operating position, the slider projects, by its rear portion, beyond the rear edge 125 of wall 118.

In this way working of the slider from the non-operating position to the operating position is more facilitated than the other way round (that is potentially more dangerous if carried out accidentally).

In the operating position advantageously the slider substantially covers the whole groove 117.

Also present in the casing is fitting means for an unstable maintenance of the pin in the retracted position, so that the pin does not inopportunely move from the non-operating position to the operating position (and, if wished, from the operating position to the non-operating position) without the working element being acted upon. In particular, the pin can be advantageously urged to the operating position by means of a helical spring 119 placed at the bottom of the seat to act rearwardly of the pin. In this case, the fitting means must efficiently counteract the spring thrust. In other words, the helical spring has a lower thrust force than the force required for overcoming the fitting means.

As better shown in FIGS. 5 and 6, the fitting means 120 for an unstable maintenance of the pin in the retracted position is disposed between the side wall of groove 117 and element 116 sliding therein. In particular, this fitting means comprises two projections 120 facing each other on opposite side walls of the groove and jutting out in the groove to interfere with element 116 and during sliding of same along the groove. Advantageously, projections 120 are extended in a direction normal to the sliding direction of the element in the groove and each interfere with a front corner of the working element, as clearly shown in FIGS. 5 and 6. These projections 120 stop towards surface 118 to allow transit of the slider and remain under the latter.

The projections can be stepped over when a thrusting action is manually exerted on the working element due to the elasticity of the surfaces coming into contact with each other. This elasticity can be merely obtained by suitably selecting the plastic material for manufacture of the casing. More advantageously, the casing can be formed with a cavity 121 behind each of the side walls carrying the projections. Thinning of the wall thus provides an elastic support for the projections. Advantageously, the cavities open on the side face 118 of the casing. In this way they can be easily obtained during molding of the casing.

The pin seat 114 and groove 117 are open on the front face 123 of the casing so as to allow the first axial introduction of the pin into the seat in the casing. Also present in the casing is stop limit means preventing a subsequent movement of the pin beyond the operating position, so that said pin cannot unintentionally fully come out of the casing and separate therefrom.

Figure 7:
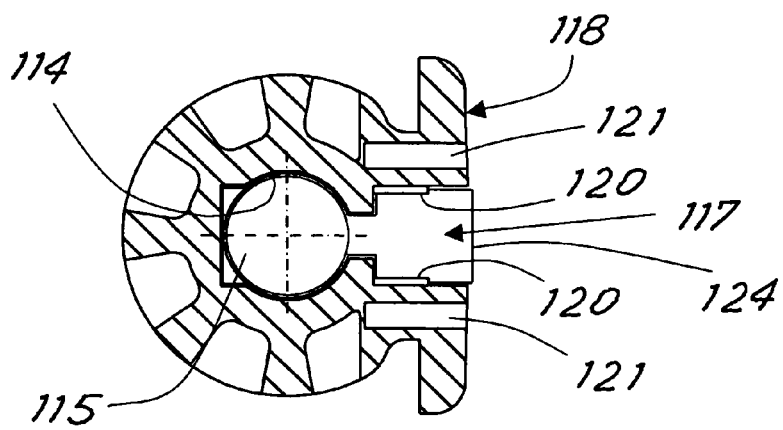
FIG. 7 is a view of the device partly sectioned along line III—III in FIG. 6.

As clearly visible in chain line in FIG. 6, the stop limit means is advantageously embodied by "fish bone-shaped" teeth 122, disposed close to the groove opening on the front face of the casing and directed to the groove inside. Due to the inclination and size of the teeth, passage of the working element is allowed when the device is assembled pushing the pin into the seating. After that, the inner edge of the teeth forms a stop limit against which the front corner of the working element strikes (as shown in chain line in FIG. 7), so as to prevent the pin from coming out beyond the operating position.

As can be seen in FIG. 5, teeth 122 stop before reaching the bridge 126 terminating ahead of groove 117 to strengthen the body structure of the device. The space between the bridge 126 and teeth 122 is adapted to allow passage of slider 124 during assembling of the device.

At this point it is apparent that the intended purposes have been achieved. In particular, the shelf-supporting device can be made up of two pieces alone (three pieces, if the spring is provided). The proposed structure for the casing body allows the casing to be made of one piece construction, being molded from a plastic material, and molding is very simple and cheap. In fact, as can be easily understood by a person skilled in the art, the mould can be made in such a manner that it has the closure of the two halves in a junction plane shown in chain dot line in FIG. 1, with a single short-stroke side carriage to make the groove 17, 117 (also forming the inner edges of teeth 22, 122) and cavities 21, 121.

Obviously, the above description of an embodiment applying the innovative principles of the present invention is given by way of example only and therefore cannot be considered as a limitation of the scope of the patent rights herein claimed. For example the proportion of the different parts can vary depending on specific requirements and the shelf thickness provided for the device. In addition, slider 124 can be made as a separate piece fastened to or fitted into the working element 116.

What is claimed is:

1. A disappearing shelf-supporting device for furniture designed to be housed on the edge of a shelf and comprising a casing having a seat in which a pin is housed, which the axially slides in the seat between an operating position, at which the pin has a front portion projecting from a front wall of the casing and configured to project beyond an edge of a shelf that can be used with the device, and a non-operating position at which the pin is retracted in said seat and configured for not projecting beyond the edge of a shelf that can be used with the device, a working element laterally projects from the pin and slides in a groove in the casing, which the groove is open on a side face of the casing to enable manual operation of the pin between the two positions of same, fitting means being further present in the casing for an unstable maintenance of the pin in the retracted position, wherein the fitting means for the unstable maintenance of the pin in the retracted position is disposed between the side wall of said groove and said working element sliding therein.

2. A device as claimed in claim 1, wherein the fitting means comprises projections disposed on the side walls of the groove and jutting out in the groove to interfere with said working element during sliding of the latter along the groove.

3. A device as claimed in claim 2, wherein the casing is formed with cavities behind the side walls carrying the projections so as to provide an elastic support for said projections.

4. A device as claimed in claim 3, wherein the cavities open on said side face of the casing.

5. A device as claimed in claim 1, wherein the projections are two, facing themselves on opposite side walls of the groove, and are extended in a direction normal to a sliding direction of the working element in the groove to interfere with the front edges of the working element.

6. A device as claimed in claim 5, wherein stop limit means consists of bone fish-shaped teeth disposed close to the groove opening on the front face of the casing and directed towards the groove inside to interfere with said working element.

7. A device as claimed in claim 1, wherein the seat and the groove are open on the front face of the casing to allow a first axial introduction of the pin into the casing and in the casing there is the presence of stop limit means preventing the pin movement beyond said operating position, which means is made in such a manner as to enable said first introduction of the pin and to counteract subsequent opposite movement of the pin beyond said operating position.

8. A device as claimed in claim 1, wherein rearwardly of the pin there is present a helical spring designed to urge the pin to the operating position with a lower force than the force required for overcoming the fitting means for the unstable maintenance of the pin in the retracted position.

9. A device as claimed in claim 1, wherein the groove and the working element have a generally T-shaped cross section with the "T" foot directed towards a pin axis.

10. A device as claimed in claim 1, wherein the casing body is obtained by molding and is of one piece construction.

11. A device as claimed in claim 1, wherein the working element terminates on the side face of the casing with an extended working slider for displacement of same with one finger of a hand between the two positions.

12. A device as claimed in claim 11, wherein the slider is extended parallel to a sliding direction of the pin.

13. A device as claimed in claim 12, wherein the slider is extended for projecting rearwardly of an edge of said side face when the pin is in the non-operating position.

14. A device as claimed in claim 11, wherein the slider has a working surface that is undulated or knurled to facilitate operation of same by one finger.

15. A device as claimed in claim 11, wherein the slider has a working surface that slightly projects over the surface of the side face.

16. A device as claimed in claim 11, wherein the groove and the working element have a generally T-shaped cross section with the "T" foot directed towards a pin axis and the slider forming an "L" with the working element.

* * * * *